United States Patent
Gupta et al.

(10) Patent No.: US 11,741,299 B2
(45) Date of Patent: Aug. 29, 2023

(54) SMART LENS ARTIFACT CAPTURE AND REVIEW RECEPTION

(71) Applicant: International Business Machines Corporation, Armonk, NY (US)

(72) Inventors: Deepak Gupta, Nodia (IN); Siddharth K. Saraya, Raniganj (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/951,525

(22) Filed: Nov. 18, 2020

(65) Prior Publication Data

US 2022/0156453 A1    May 19, 2022

(51) Int. Cl.
*G06F 40/169* (2020.01)
*G06F 40/197* (2020.01)
*G06F 3/01* (2006.01)
*G06F 40/117* (2020.01)
*G02B 27/01* (2006.01)

(52) U.S. Cl.
CPC ......... *G06F 40/169* (2020.01); *G02B 27/017* (2013.01); *G06F 3/013* (2013.01); *G06F 40/117* (2020.01); *G06F 40/197* (2020.01); *G02B 2027/014* (2013.01); *G02B 2027/0178* (2013.01)

(58) Field of Classification Search
CPC .... G06F 40/169; G06F 40/197; G06F 40/117; G06F 3/013; G02B 27/017; G02B 2027/014; G02B 2027/0178
See application file for complete search history.

(56) References Cited

U.S. PATENT DOCUMENTS

| | | | |
|---|---|---|---|
| 9,747,268 B2 | 8/2017 | Meisels et al. | |
| 9,965,475 B2 | 5/2018 | Gan et al. | |
| 10,599,526 B2 | 3/2020 | Milvaney et al. | |
| 2012/0284344 A1 | 11/2012 | Costenaro et al. | |
| 2013/0083063 A1* | 4/2013 | Geisner | G09G 5/363 345/633 |
| 2013/0222638 A1* | 8/2013 | Wheeler | H04N 21/4223 348/231.2 |
| 2015/0220802 A1* | 8/2015 | Mazur | G06F 3/013 345/156 |
| 2016/0350595 A1* | 12/2016 | Solomin | G06K 9/6263 |
| 2018/0081519 A1 | 3/2018 | Kim | |
| 2018/0126476 A1* | 5/2018 | Meess | B23K 9/0956 |
| 2018/0288391 A1* | 10/2018 | Lee | G06F 3/011 |

(Continued)

OTHER PUBLICATIONS

"Eye tracking", Wikipedia, Page was last edited on Oct. 16, 2020, 20 pages, <https://en.wikipedia.org/wiki/Eye_tracking>.

(Continued)

*Primary Examiner* — Keith D Bloomquist
(74) *Attorney, Agent, or Firm* — Gavin Giraud (57) ABSTRACT

Aspects of an embodiment of the present invention disclose a method, computer program product, and computing system that receives, at a processor, a review record comprising an image of an artifact and reference links associated with the artifact, wherein the image is recorded with a smart lens. The present invention also assigns the review record to a reviewer based on a qualification associated with the reviewer and the review record and receives a comment from the reviewer. The method performed in embodiments of the present invention also includes relaying the comment to the smart lens.

20 Claims, 4 Drawing Sheets

(56) References Cited

U.S. PATENT DOCUMENTS

2018/0365785 A1* 12/2018 Boss ................... H04L 67/306
2019/0370544 A1* 12/2019 Wright, Jr. ......... G02B 27/0101
2020/0160968 A1* 5/2020 Lyman ................ G06T 7/0012

OTHER PUBLICATIONS

Flanigan, Tara, "These futuristic contact lenses could record video in a blink of an eye", Mashable, Jun. 8, 2017, 6 pags, <https://mashable.com/2017/06/08/smart-contact-lenses-record-video/>.

Ji et al., "Real-Time Eye, Gaze, and Face Pose Tracking for Monitoring Driver Vigilance", Real-Time Imaging, vol. 3, Issue 5, Oct. 2002, pp. 357-377, <https://www.sciencedirect.com/science/article/abs/pii/S1077201402902792>.

Lavars, Nick, "Smart contacts: The future of the wearable you won't even see", New Atlas, Jul. 3, 2020, 11 pages, <https://newatlas.com/wearables/contact-lens-future-wearable-augmented-reality/>.

Purcher, Jack, "Samsung wins Patent for Augmented Reality Contact Lenses", Patently Mobile, Jul. 29, 2019, 3 pages, <https://www.patentlymobile.com/2019/07/samsung-wins-patent-for-augmented-reality-contact-lenses-.html>.

Stump, Scott, "Sony applies for patent on contact lens camera that shoots photos in a blink", CNBC, May 4, 2016, 3 pages, <https://www.cnbc.com/2016/05/03/sony-applies-for-patent-on-contact-lens-camera-that-shoots-photos-in-a-blink.html>.

Wong, Raymond, "Samsung patents smart contact lenses with a built-in camera", Mashable, Apr. 5, 2016, 9 pages, <https://mashable.com/2016/04/05/samsung-smart-contact-lenses-patent/>.

* cited by examiner

SMART LENS ARTIFACT CAPTURE AND REVIEW RECEPTION

BACKGROUND OF THE INVENTION

The present invention relates generally to the field of reviewing artifacts, and more particularly to providing feedback to an editor wearing a smart lens.

Modern trends in cloud storage have increased collaboration in the creation of documents and coding of software. Collaboration options have also increased, whereby editors can markup documents and software code before sending the document to others for review. For example, an editor of a document can track specific changes or highlight an area of text for review. The changes may be tracked for specific versions of the document, and for specific editors. Some review systems enable multiple reviewers to view and edit the document at the same time, including accepting or rejecting changes by the editor or another reviewer, or commenting on a change and soliciting further revision. The editor may review the comments and proceed to draft/code according to the feedback received. Some documents are sent to a reviewer within a body of an electronic message to reviewers that are collaborating on the document. The reviewer receiving the electronic message may accept or reject changes and make comments, modifications, or suggestions to the document changes that are contained within the electronic message. For example, a reviewer may edit the document changes that are included within the body of the electronic message to add a comment and/or make changes to the change. A reviewer may also have the option to accept/reject changes directly from within the electronic message. After making any changes, the reviewer replies to the electronic message and the changes that are included within the electronic message are applied to the document.

SUMMARY

Aspects of an embodiment of the present invention disclose a method, computer program product, and computing system that receives, at a processor, a review record comprising an image of an artifact and reference links associated with the artifact, wherein the image is recorded with a smart lens. A processor also assigns the review record to a reviewer based on a qualification associated with the reviewer and the review record and receives a comment from the reviewer. Additionally, the processor in embodiments of the present invention also relays the comment to the smart lens.

DETAILED DESCRIPTION

The disclosed embodiments include devices and methods for document review and collaboration for an editor using a smart lens. The smart lens captures images of an artifact and reference links associated with the artifact so that a reviewer looking at the artifact and the reference links can make an informed decision when suggesting new changes and/or providing feedback to the editor. Any comments from the reviewer can be conveyed back to the editor wearing the smart lens, so that they can implement the suggestions or otherwise complete the drafting of the artifact.

Figure 1:
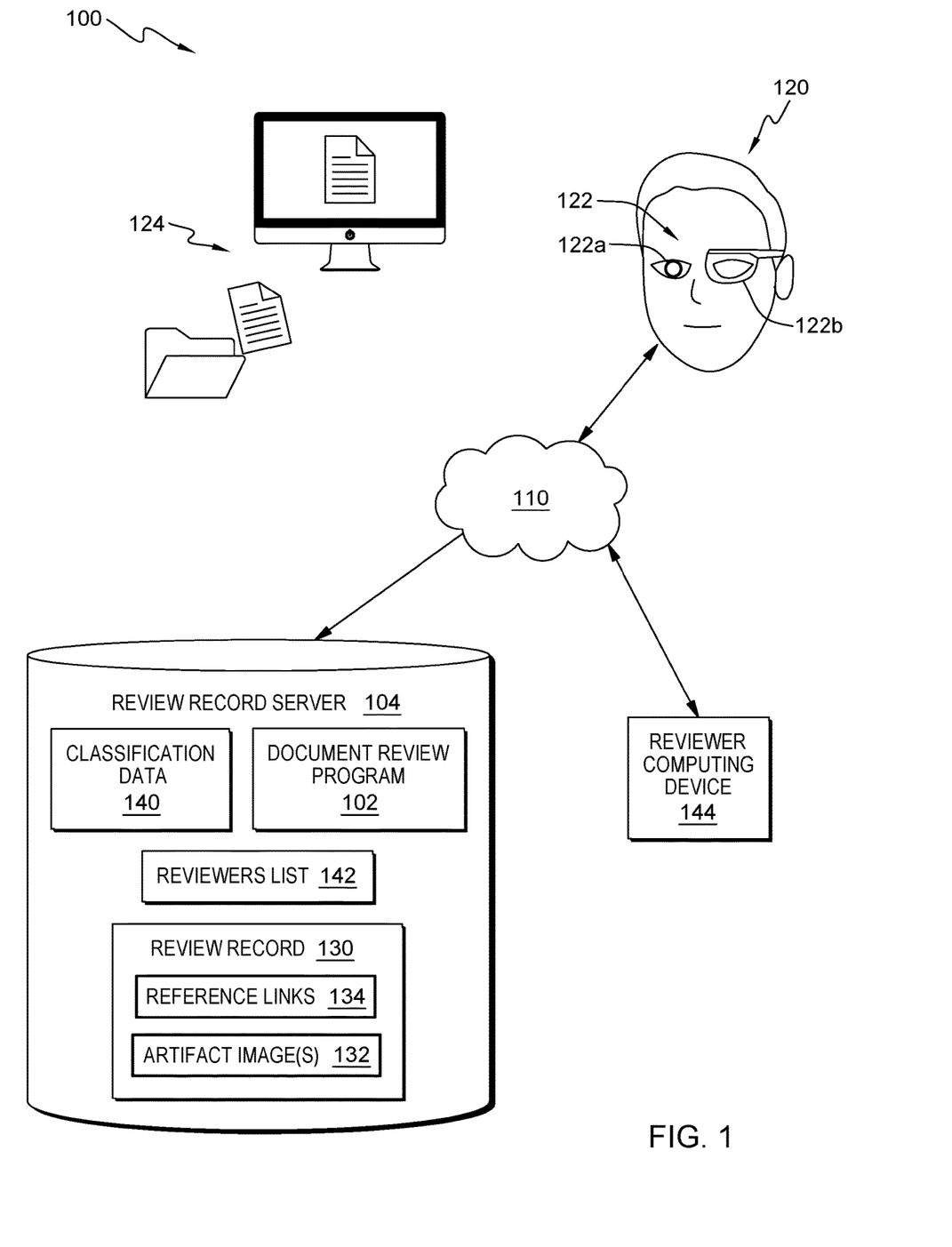
FIG. 1 depicts a schematic diagram of a system in accordance with one embodiment of the present invention.

FIG. 1 depicts a diagram of an environment 100 in accordance with one embodiment of the present invention. FIG. 1 provides only an illustration of one embodiment and does not imply any limitations with regard to the environments in which different embodiments may be implemented.

In the depicted embodiment, the environment 100 includes a document review program 102 embodied on a review record server 104 connected with the environment 100 over a network 110. The network 110 may be a local area network (LAN), a wide area network (WAN), any combination thereof, or any combination of connections and protocols that will support communications with the review record server 104 in accordance with embodiments of the invention. The network 110 may include wired, wireless, or fiber optic connections. The environment 100 may include additional computing devices, servers, computers, or other devices not explicitly shown.

The environment 100 includes an editor 120 wearing a smart lens 122. The smart lens 122 may be, for example, a contact lens 122a worn directly on the editor's 120 eye, or may be a peripherally worn lens, such as binoculars, body cam, goggles, or eye glasses 122b. The smart lens 122 captures images/video from the field of view of the editor 120 also tracks a gaze pattern of the editor 120 such that an item or area within the field of view may be determined to be the "focus" of the editor 120. The smart lens 122 may record an image at the location of the editor's 120 focus while the editor 120 views an artifact 124, and convey that image in a review record 130 through the network 110. The review record 130 is a file or collection received by the document review program 102 through the network 110 that contains one or several images of the artifact 124, and may contain other information for review as explained below.

For purposes of this application, the artifact 124 may include items such as documents, presentations, batches of code, visual media files, or other digital projects that may be viewed on a computer screen. The artifact 124 may also include paper files and folders that the editor 120 views, reviews, and edits through the course of working on a task. Thus, the editor 120 may be a student working on homework, in which case the artifact 124 may be a textbook or worksheet. Or, the editor 120 could be a computer programmer, in which case the artifact 124 may include a computer monitor showing the code that the programmer is compiling. Additionally or alternatively to documents, the artifact 124 may include events, objects, or occurrences that the editor 120 observes away from a desk or computer. For example, if the editor 120 is a law enforcement officer, the artifact 124 could be an interaction with a civilian reporting a crime, or a vehicle speeding along a roadway. Also, if the editor 120 is a musician, the artifact 124 may be an instrument during practice. Thus, the artifact 124 includes a broad range of items, and artifact images 132 captured by the smart lens 122 are included in the review record 130 received by the document review program 102.

The review record 130 contains the artifact images 132 in the collection, and may also include reference links 134 that provide context for the artifact images 132 in the review record 130. Like the artifact 124, the reference links 126 may include generated/printed images, or real-life objects and interactions. For example, the reference links 134 may include additional images captured by the smart lens 122. That is, while the editor 120 is interacting (i.e., viewing, editing, practicing) with the artifact 124 they may reference websites, manuals, charts, photos, other examples of code, books, and/or other documents or items to complete their ideas for the current project. For example, editors 120 that are students or journalists may review a textbook or article while they are drafting an essay, guitarists may look at tabs or sheet music, or a pedestrian may look at a street sign or a store front. The reference links 126 include, collectively, the materials and locations that the editor 120 views during generation of the review record 130.

Reference links 126 may also be manually attached to the review record 130. For example, the editor 120 may use a smartphone, computer, or other device to attach a website, a PDF document, or a GPS location to the review record 130 before it is received by the document review program 102. Subsequently, over a time frame after the initiation signal, the smart lens 122 captures the artifact image(s) 132 and the reference links 134, attaches the artifact images 132 and the reference links 134 to the review record 130, and sends the review record 130 to the network 110.

While only one editor 120 is illustrated, the review records 130 may be received from multiple editors 120 and smart lenses 122. The document review program 102 receives the review records 130 into the server 104 and organizes the review records 130 according to classification data 140 loaded onto the server 104. The classification data 140 contains a selection of qualifications that may be present in the review record 130 and enables the document review program 102 to search the artifact images 132 for context (e.g., items, objects, words) that could be used as a qualification to connect the review record 130 with a reviewer. For example, the document review program 102 will assign a qualification to the review record 130 by analyzing the I.D. of the editor 120, log-in credentials of the editor 120, a time stamp, a location, an application where the artifact is located, a coding language, or other information provided within the reference links 134. The classification data 140 may be used in conjunction with machine learning as well, to parse information from the artifact images 132. That is, the document review program 102 may assign a qualification to the review record 130 based on detecting the presence of a particular item (e.g., document, instrument, vehicle) within the artifact image 132. Machine learning may also be used to read any text within the artifact images 132 and assign a qualification based on the detected textual classification data 140.

The review record server 104 may also include a reviewers list 142 of potential reviewers having qualifications that the document review program 102 may match to the review records 130. The reviewers list 142 may include a variety of people, programs, or machines with expertise in a variety of skill areas. The document review program 102 assigns the review record to a reviewer or multiple reviewers from the reviewers list 142, and receives reviewer input from a reviewer computing device 144 from the reviewers over the network 110. The reviewer input may include suggestions, recommendations, and/or feedback regarding the artifact 124. For example, the reviewer may include a suggestion for correcting grammar, or may point out the location of a particular item (e.g., notes on a piano, organ during surgery, tool during a repair job). The reviewer input may be relayed to the smart lens 122 for further review and execution by the editor 120.

Figure 2:
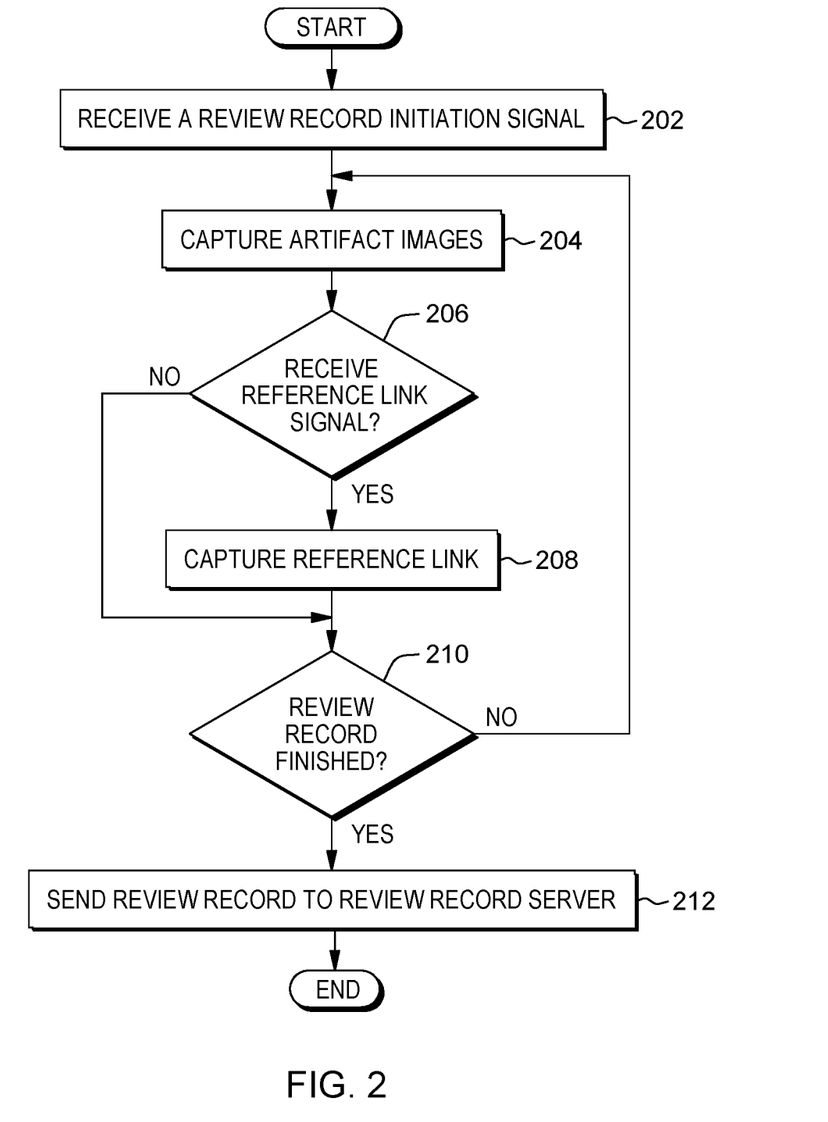
FIG. 2 depicts a flowchart of the steps of a document review program executing within the system of FIG. 1, in accordance with one embodiment of the present invention.

FIG. 2 depicts a flowchart of actions executing on the smart lens 122 in FIG. 1, in accordance with one embodiment of the present invention. The smart lens 122 receives a review record initiation signal from the editor 120 (block 202). The initiation signal may be any motion or action taken by the editor 120 (e.g., with their eyes or with their hands) that may be read and acknowledged by the smart lens 122. In certain embodiments the smart lens 122 may recognize an intentional double blink, a wink, a squint, a triple blink, or other action from the editor's 120 eye as the initiation signal or the smart lens 122. In certain embodiments, the smart lens 122 may recognize a hand motion from the editor 120 in view of the smart lens 122. For example, the editor 120 may show 3 fingers, or an "OK" sign to initiate a review record 130. Other actions may also be received by the smart lens 122 as the initiation signal to generate a review record 130.

As part of operation within the environment 100, the smart lens 122 captures the artifact images 132 with a camera (block 204). In certain embodiments, the smart lens captures the artifact images 132 immediately after receiving the initiation signal. The smart lens 122 may be programmed to capture the artifact images 132 as a single photo, a series of photos (e.g., one photo per second for ten seconds), or may begin capturing the artifact images 132 as a video feed. The smart lens 122 may also include a buffer of images that are captured before receiving the initiation signal. Such a buffer would be constantly overwritten until the smart lens 122 receives the initiation signal. A buffer of artifact images 124 may be useful in situations where the editor 120 is in a position in which the artifacts 124 include sudden, surprising, or short-lived occurrences. The smart lens 122 may also continue capturing artifact images 132 (e.g., one image every 10 seconds, 20 seconds, 30 seconds, 60 seconds) until the review record 130 finishes.

As part of operation within the environment 100, the smart lens 122 monitors for whether a reference link signal has been received (block 206). Like the review record initiation signal, the reference link signal may include any programmed actions by eye or by hand of the editor 120. The review record initiation signal and the reference link signal would not be the same, however. For example, if the smart lens 122 was programmed to receive a double blink as the review record initiation signal, then the reference link signal would include something other than a double blink (three fingers in front of the smart lens 122, or hands folded, etc.). The reference link signal may also include an action of the gaze pattern of the editor 120. For example, if the smart lens 122 recognizes a particular document or item as the artifact 124, then looking away from artifact 124 may, in certain embodiments, be considered a reference link signal.

If the smart lens 122 receives the reference link signal (block 206 "Yes"), then the smart lens 122 captures a reference link 134 (block 208). The reference links 134 may be captured as a single photo, a series of photos (e.g., one photo per second for ten seconds), or may begin capturing the artifact images 132 as a video feed, like the artifact images 132. The reference links 134, however, are marked as such in the review record 130, and the document review program 102 will assign the review record 130 primarily on the artifact images 132.

If the smart lens 122 does not receive a reference link signal (block 206 "No"), then the smart lens 122 monitors whether the review record 130 is finished (block 210). The review record 130 may finish at the termination of a time limit, or the editor 120 may give a termination signal in a manner similar to the review record initiation signal or the reference link signal. In certain embodiments, the review record initiation signal and the termination signal may be same. If the review record 130 does not finish (block 210 "No"), then the smart lens 122 continues to capture artifact images 132 or monitor for capturing reference links 134. If the smart lens 122 detects that the review record 130 is finished (block 210 "Yes"), then the smart lens 122 sends the review record to the review record server 104.

Figure 3:
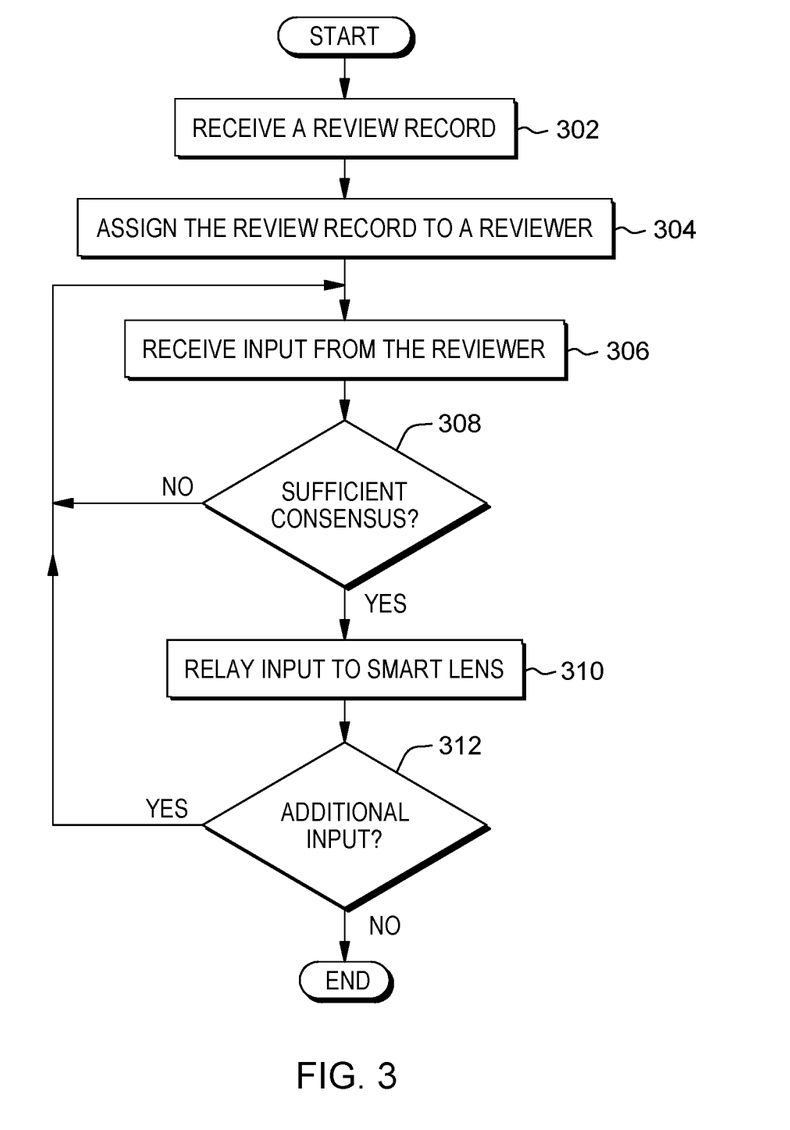
FIG. 3 depicts a flowchart of actions taken by the document review program executing on the review record server of FIG. 1, in accordance with one embodiment of the present invention.

FIG. 3 depicts a flowchart of actions taken by the document review program 102 executing on the review record server 104 of FIG. 1, in accordance with one embodiment of the present invention. The document review program 102 receives a review record 130 that has artifact image(s) 132 and reference link(s) 134 associated with the artifact 124 (block 302). The artifact image 132 is captured by the smart lens 122 which uses a gaze pattern of the editor 120 to identify the reference links 126. The document review program 102 receives the review record 130 over the network 110 and stores the review record 130 within the review record server 104.

The document review program 102 assigns the review record 130 to the reviewer based on a qualification associated with the reviewer and the review record 130 (block 304). In certain embodiments, the document review program 102 selects the reviewer at random from a pool of qualified reviewers or according to a docket of work currently assigned to the reviewer. The review record 130 may also be assigned the reviewer based on qualifications shared by the review record 130 and the reviewer. That is, a reviewer may have certain qualifications (e.g., expertise, experience, training, credentials) that make him or her especially efficient at reviewing a particular type of review record. The qualification of the reviewer may be based on expertise associated with: the artifact 124 (e.g., a musical instrument being practiced by the editor 120), the subject matter of the artifact 124 (e.g., the artifact 124 is a math assignment, news article), an identity of an editor 120 (e.g., editor identity is given in the review record 130 using log-in information from the editor 120), a role of the editor 120 (e.g., expertise as the editor's 120 boss), a time stamp, a particular software application, a coding language, or other criterion.

In certain embodiments, the document review program 102 uses image detection techniques to recognize the subject matter within the artifact images 132. For example, document review program 102 may read the words written in an article captured as an artifact image 132. Natural language processing may then indicate the artifact 124/article relates to a specific topic or another. Furthermore, the smart lens 122 may detect that the artifact 124 is a particular object based on comparison with machine learning done with similar objects.

The reviewer looks over the review record 130 and provides comments and suggestions as reviewer input for how the editor 120 might best proceed in the task with the artifact 124. The nature of the reviewer input depends on the subject matter of the artifact 124. The document review program 102 receives the reviewer input from the reviewer through the network 110 (block 306). In certain embodiments, the review record 130 may be assigned to multiple reviewers to provide thorough feedback for the editor 120. The multiple reviewers may review the review record 130 separately, or in certain embodiments may collaboratively view the review record 130 before their reviewer input is received by the document review program 102. If the review record 130 is reviewed separately, the document review program 102 may analyze the reviewer input for commonalities and differences between the plurality of comments. If there is not sufficient consensus between the comments from the reviewers (block 308, "No"), then the document review program 102 receives further input from the reviewers. For example, comments from one reviewer may include a suggestion for an additional action to be taken by the editor 120. Analysis of comments from additional reviewers may confirm the suggestion. When the document review program 102 determines that the reviewer input has a sufficient consensus (block 308, "Yes"), then the document review program 102 relays the reviewer input to the smart lens 122 (block 310). Sufficient consensus may be detected after expiration of a time limit.

In embodiments where the reviewer input is collaborative, the consensus may be implied such that all the reviewer input is relayed to the smart lens 122. For example, the editor 120 may be an emergency responder on location while the reviewers are doctors providing medical advice. In time-sensitive procedures like this, quick feedback may take priority over any analysis that could be performed by the document review program 102. Emergency situations may also benefit from multiple rounds of review. The document review program 102 therefore seeks additional input, and if there is additional input (block 312, "Yes") then the document review program 102 again receives input from the reviewer(s) and relays the input to the smart lens 122. When there is no additional input (block 312 "No"), the document review program 102 closes the review record 130.

Figure 4:
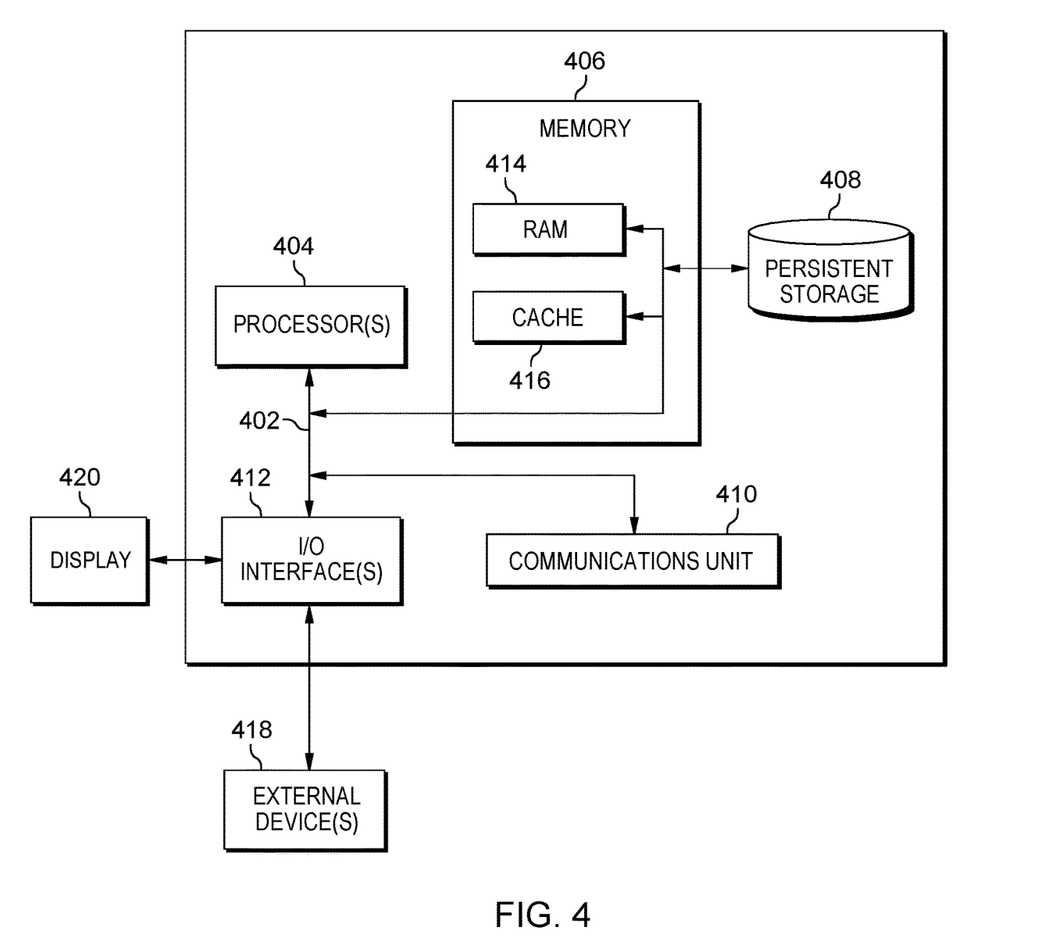
FIG. 4 depicts a block diagram of components of the computing device in accordance with one embodiment of the present invention.

FIG. 4 depicts a block diagram of components of the smart lens 122 and the review record server 104 in accordance with an illustrative embodiment of the present invention. It should be appreciated that FIG. 4 provides only an illustration of one implementation and does not imply any limitations regarding the environments in which different embodiments may be implemented. Many modifications to the depicted environment may be made.

The smart lens 122 and the review record server 104 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. I/O interface(s) 412 allows for input and output of data with other devices. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. Software and data used to practice embodiments of the present invention (e.g., document review program 102) can be stored on such portable computer-readable storage media and can be loaded onto persistent storage of the review record server 104 via I/O interface(s) 412. I/O interface(s) 412 also connect to a display 420. Display 420 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
receiving, at a processor, a review record comprising:
an image of an artifact recorded with a smart lens worn by an editor, wherein the image is recorded in response to a detected action of a gaze pattern of the editor, and
a first reference link and a second reference link associated with the artifact and marked as separate from the artifact, wherein the first reference link is captured with the smart lens while the editor is interacting with the artifact, and the second reference link is captured during a buffer before the detected action;
determining, using one or more processors, a qualification of the review record based on the image, the first reference link, and the second reference link;
assigning the review record to a reviewer based only on one or more processors matching the qualification to the reviewer;
receiving reviewer input from the reviewer;
determining whether the qualification indicates a time-sensitive procedure; and
relaying the reviewer input to the smart lens or to an additional reviewer based on the indication of a time-sensitive procedure.

2. The method of claim 1, wherein each of the first reference link and the second reference link comprise a selection related to the artifact as determined by the smart lens, the selection selected from the group consisting of objects and references.

3. The method of claim 1, wherein an intentional double blink of an editor wearing the smart lens initiates generation of the review record.

4. The method of claim 1, wherein, the qualification comprises an expertise selected from the group consisting of: a subject matter of the artifact, an identity of an editor, a role of the editor, a time stamp, a software application, and a coding language.

5. The method of claim 1, further comprising determining the qualification by detecting context from the image.

6. The method of claim 1, further comprising assigning the review record to a second additional reviewer.

7. The method of claim 6, further comprising:
receiving an additional reviewer input from the additional reviewer; and
relaying an analysis of similarities and differences between the reviewer input and the additional reviewer input to the smart lens.

8. The method of claim 1, further comprising:
receiving an additional reviewer input from the reviewer after relaying the reviewer input to the smart lens; and
relaying an analysis of similarities and differences between the reviewer input and the additional reviewer inputs to the smart lens.

9. The method of claim 1, comprising:
receiving an action image of an action captured by the smart lens after relaying the reviewer input to the smart lens; and
attaching the action image to the review record.

10. A computer program product for generating a review record of a smart lens, the computer program product comprising:
one or more computer-readable storage media and program instructions stored on the one or more computer-readable storage media, the program instructions comprising:
program instructions to receive a review record comprising an image of an artifact and a first reference link and a second reference link associated with the artifact and marked as separate from the artifact, wherein the image is recorded with a smart lens worn by an editor in response to a detected action of a gaze pattern of the editor, the first reference link is captured with the smart lens while the editor is interacting with the artifact, and the second reference link is captured during a buffer before the detected action;
program instructions to determine a qualification of the review record based on the image, the first reference link, and the second reference link;
program instructions to assign the review record to a reviewer based only on one or more processors matching the qualification to the reviewer;
program instructions to receive a comment from the reviewer;
program instructions to determine whether the qualification indicates a time-sensitive procedure; and
program instructions to relay the comment to the smart lens or to an additional reviewer based on the indication of a time-sensitive procedure.

11. The computer program product of claim 10, wherein the reference links comprise objects or references.

12. The computer program product of claim 10, wherein the review record is generated at an intentional double blink of an editor wearing the smart lens.

13. The computer program product of claim 10, wherein, the qualification comprises an expertise selected from the group consisting of subject matter of the artifact, an identity of an editor, a role of the editor, a time stamp, a software application, and a coding language.

14. The computer program product of claim 10, comprising determining the qualification by detecting context from the image.

15. The computer program product of claim 10, comprising assigning the review record to a plurality of additional reviewers.

16. The computer program product of claim 15, further comprising:
receiving a plurality of reviewer inputs from the reviewer and the additional reviewers; and
relaying an analysis of similarities and differences between the plurality of reviewer inputs to the smart lens.

17. The computer program product of claim 10, further comprising:
  receiving additional reviewer inputs from the reviewer after relaying the reviewer input to the smart lens; and
  relaying an analysis of similarities and differences between the reviewer input and the additional reviewer inputs to the smart lens.

18. The computer program product of claim 10, comprising:
  receiving an action captured by the smart lens after relaying the comments to the smart lens; and
  attaching the action to the review record.

19. A computer system for generating a review record of a smart lens, the computer system comprising:
  one or more computer processors, one or more computer readable storage media, and program instructions collectively stored on the one or more computer readable storage media for execution by at least one of the one or more computer processors, the program instructions comprising:
    program instructions to receive a review record comprising an image of an artifact and a first reference link and a second reference link associated with the artifact and marked as separate from the artifact, wherein the image is recorded with a smart lens worn by an editor in response to a detected action of a gaze pattern of the editor, the first reference link is captured with the smart lens while the editor is interacting with the artifact, and the second reference link is captured during a buffer before the detected action;
    program instructions to determine a qualification of the review record based on the image, the first reference link, and the second reference link;
    program instructions to assign the review record to a reviewer based only on one or more processors matching the qualification to the reviewer;
    program instructions to receive a comment from the reviewer;
    program instructions to determine whether the qualification indicates a time-sensitive procedure; and
    program instructions to relay the comment to the smart lens or to an additional reviewer based on the indication of a time-sensitive procedure.

20. The system of claim 19, comprising:
assigning the review record to a plurality of additional reviewers;
receiving a plurality of reviewer inputs from the reviewer and the additional reviewers; and
relaying an analysis of similarities and differences between the plurality of reviewer inputs to the smart lens.

* * * * *